S. P. GRAHAM.

Improvement in Carriage-Seats.

No. 4,908. Reissued May 21, 1872.

Attest.

Philip M. Shuey.
J. Twohig

Inventor.

Simon P. Graham,
per Fisher and Fisher,
his Attys in fact.

AM. PHOTO-LITHOGRAPHIC CO. N.Y. (OSBORNE'S PROCESS.)

4,908

UNITED STATES PATENT OFFICE.

SIMON PETER GRAHAM, OF LONDON, CANADA, ASSIGNOR TO THEODORE COMSTOCK.

IMPROVEMENT IN CARRIAGE-SEATS.

Specification forming part of Letters Patent No. 115,842, dated June 13, 1871; reissue No. 4,908, dated May 21, 1872.

I, SIMON PETER GRAHAM, of London, in the county of Middlesex, Province of Ontario and Dominion of Canada, have invented a certain new and useful Improved Carriage-Seat, of which the following is a specification:

My invention relates to sundry improvements in the rails, bottom, spindles, and pillars of carriage-seats, all tending toward increased simplicity and cheapness of construction.

Figure 1:
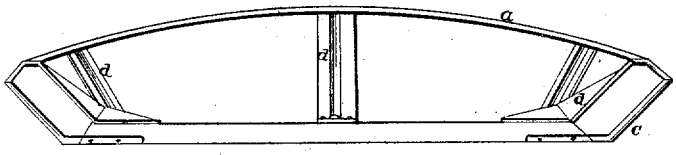
Figure 2:
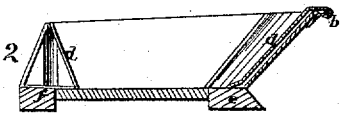
Figure 3:
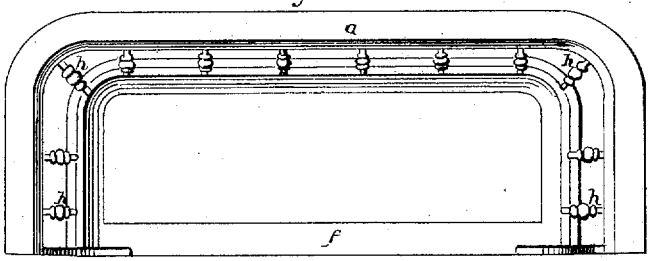
Figure 4:
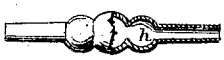

In the accompanying drawing, Figure 1 is a front elevation of that variety of seat in which wooden or iron panels are used. Fig. 2 is a transverse vertical section of the same. Fig. 3 is a plan view of that variety of seat in which spindles are used; and Fig. 4 is a detached view of one of the hollow spindles.

Referring to the drawing, the first improvement is in the top rail *a* of the seat, which is to be made of one strip of sheet metal, bent so as to inclose an iron or steel wire or rod, *b*, at the back of the rail, which rod *b* extends outward from each end of the sheet metal envelope far enough to form the side handles *c*; this forming a neater, cheaper, and better finish than the ordinary method of attaching side handles to buggy-seats. This top rail will answer the same purpose if rolled out of solid iron. When wooden panels are used between the rail and bottom of the seat the rail is formed with a recess in its inner edge to receive the upper edges of the panels, by which arrangement both the rail and panels are strengthened. When iron panels are used their upper edges project within the laps of the rail, rendering the recess unnecessary. My second improvement relates to the plates *d*, which form both the corner irons and the pillars or back-supporters of the seat. The plates are stamped up out of sheet metal. The corner irons can have laps turned back at their front edges, to receive the wooden panels and make a finish. My third improvement relates to the bottom *e* of the seat, which can be made either by taking a solid piece of tough timber and sawing one or more longitudinal kerfs inward from each end far enough to clear the corners to be bent, and then steaming and bending the piece to the proper shape, and doweling the divided ends together; or by taking two or more strips of timber, of which the inner ones should be thinner than the outer, laying them together, steaming and bending them, and doweling when dry. This forms the ends and back of the bottom frame, and the front consists of a cross-piece, *f*, framed at its ends into the piece *e*. By this method glued joints are dispensed with, cross-grained lumber avoided, and additional strength received. My fourth improvement relates to a solid iron rail, *a*, made in one piece. My fifth improvement relates to a solid iron rail whose ends are continued out to form handles, as *c*, the rail and handles being made in one piece. My sixth improvement relates to a solid iron rail upon whose ends are formed handles, as *c*, and corner irons, as *d*, the rail, handles, and corner irons being made in one piece. My seventh improvement relates to the spindles *h*, made out of sheet metal, stamped each in two halves, which are then soldered together, having the inside hollow, making strong, cheap, and light spindles.

What I claim as new, and desire to secure by Letters Patent, is—

1. The improved carriage-seat constructed of the several parts, combined and arranged as herein shown and described.

2. The sheet or solid metal top-rail *a*, constructed substantially as and for the purposes specified.

3. The sheet or solid metal top rail *a*, combined with the rod *b*, substantially as and for the purposes specified.

4. The handles *c*, made in one piece with the rod *b*, when the latter is combined with the sheet-metal top rail, substantially as and for the purposes specified.

5. The combination of the sheet or solid metal top rail *a* and the metal spindles *h*, substantially as and for the purposes set forth.

6. The solid-iron rail *a*, made in one piece with the rod *b* and the side handles *c*, substantially as and for the purposes set forth.

7. The hollow sheet-metal spindle *h*, for sustaining the rail of a carriage-seat, substantially as specified.

8. The plates or corner irons *d*, made of any proper material, substantially as and for the purposes specified.

SIMON PETER GRAHAM.

Witnesses:

WARREN JIVINS,
*Of the city of London, Ontario, Book-keeper.*

JNO. J. BROWN,
*Of the same place, Attorney at law.*